(12) United States Patent
Iguchi (10) Patent No.: US 11,657,972 B2
(45) Date of Patent: May 23, 2023

(54) DIELECTRIC COMPOSITION AND MULTILAYER CERAMIC ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 108 days.

(21) Appl. No.: 17/361,826

(22) Filed: Jun. 29, 2021

(65) Prior Publication Data

US 2022/0028611 A1   Jan. 27, 2022

(30) Foreign Application Priority Data

Jul. 27, 2020   (JP) .............................. JP2020-126554

(51) Int. Cl.
*H01G 4/12* (2006.01)
*H01G 4/30* (2006.01)
*H01G 4/008* (2006.01)
*C04B 35/468* (2006.01)
*H01G 4/012* (2006.01)

(52) U.S. Cl.
CPC ....... *H01G 4/1227* (2013.01); *C04B 35/4682* (2013.01); *H01G 4/008* (2013.01); *H01G 4/012* (2013.01); *H01G 4/30* (2013.01); *C04B 2235/66* (2013.01)

(58) Field of Classification Search
CPC .. C04B 35/4682; C04B 2235/66; H01G 4/30; H01G 4/1227
See application file for complete search history.

(56) References Cited

U.S. PATENT DOCUMENTS

| | | | | |
|---|---|---|---|---|
| 2011/0111947 | A1* | 5/2011 | Natsui ................ | C04B 35/4682 423/598 |
| 2019/0148042 | A1* | 5/2019 | Yun ..................... | H01G 4/1281 361/275.3 |
| 2020/0051742 | A1* | 2/2020 | Park ................... | C04B 35/4682 |
| 2021/0118615 | A1* | 4/2021 | Shimura ............. | H01G 4/1227 |
| 2022/0254569 | A1* | 8/2022 | Ariizumi ............ | H01G 4/1209 |
| 2022/0254570 | A1* | 8/2022 | Ariizumi ............ | H01G 4/1227 |
| 2022/0384111 | A1* | 12/2022 | Iguchi ................ | C04B 35/4682 |
| 2022/0384112 | A1* | 12/2022 | Iguchi ................ | C04B 35/4682 |

FOREIGN PATENT DOCUMENTS

| CN | 102070334 A | 5/2011 |
|---|---|---|
| JP | 2017-011142 A | 1/2017 |

\* cited by examiner

*Primary Examiner* — Nathan Milakovich
(74) *Attorney, Agent, or Firm* — Oliff PLC (57) ABSTRACT

A dielectric composition includes dielectric particles. At least one of the dielectric particles include a main phase and a secondary phase. The main phase has a main component of barium titanate. The secondary phase exists inside the main phase and has a higher barium content than the main phase.

15 Claims, 3 Drawing Sheets

DIELECTRIC COMPOSITION AND MULTILAYER CERAMIC ELECTRONIC COMPONENT

BACKGROUND OF THE INVENTION

The present invention relates to a dielectric composition including dielectric particles and a multilayer ceramic electronic component including the dielectric composition.

As shown in Patent Document 1, there is a multilayer ceramic electronic component in which a plurality of dielectric layers and a plurality of internal electrode layers are laminated. In such a multilayer ceramic electronic component, there has recently been a demand for miniaturization of elements and thinning of the dielectric layers. When the elements are miniaturized or the dielectric layers are thinned, however, the dielectric layers are likely to have defects, such as cracks, at the time of application of external stress.

As a method of increasing the mechanical strength of the dielectric layers, for example, it is conceivable to reduce the particle size of the dielectric particles constituting the dielectric layers. When the dielectric particles are miniaturized, however, the relative permittivity tends to be low, and it is difficult to simultaneously satisfy both of the high relative permittivity and the improvement of the mechanical strength.

Patent Document 1: JP2017011142 (A)

BRIEF SUMMARY OF INVENTION

The present invention has been achieved under such circumstances. It is an object of the invention to provide a dielectric composition having a high mechanical strength and a high relative permittivity and a multilayer ceramic electronic component including the dielectric composition.

To achieve the above object, a dielectric composition according to the present invention comprises dielectric particles, wherein at least one of the dielectric particles include:

a main phase having a main component of barium titanate; and a secondary phase existing inside the main phase and having a higher barium content than the main phase.

In the dielectric composition according to the present invention, as mentioned above, a Ba-rich secondary phase exists inside at least one of the dielectric particles. Since such a secondary phase exists inside the dielectric particles, it is considered possible to prevent cracks from growing in particles. As a result, cracks can be prevented from occurring even if an external stress is applied to the dielectric composition, and the dielectric composition according to the present invention has a high mechanical strength. The dielectric composition according to the present invention can prevent cracks and have a high relative permittivity.

Preferably, the secondary phase has a particle size of 10 nm or more and 100 nm or less. When the particle size of the secondary phase is in such a range, the mechanical strength is further improved, and the relative permittivity is also further improved.

A ratio (Ba/Ti) of a barium element (Ba) content to a titanium element (Ti) content in the secondary phase can be 1.2-2.0.

Preferably, an area ratio occupied by the dielectric particles each including the secondary phase in a cross section of the dielectric composition is 30-80%. When the content ratio of the particles including the secondary phase is in such a range, the mechanical strength is further improved, and the relative permittivity is also further improved.

Preferably, the dielectric particles include large particles having a circle equivalent diameter of 0.5 μm or more and small particles having a circle equivalent diameter of less than 0.5 μm, and the secondary phase exists inside the main phase of the large particles. In this structure, the dielectric composition according to the present invention has an improved high temperature load life.

Preferably, a ratio of an area occupied by the large particles each including the secondary phase to an area occupied by the large particles in a cross section of the dielectric composition is 50% or more. In this structure, the dielectric composition according to the present invention has a further improved mechanical strength and also has a further improved relative permittivity.

A ratio of the area occupied by the large particles in the cross section of the dielectric composition can be 50-90%.

The dielectric composition according to the present invention can advantageously be used for a multilayer ceramic electronic component.

DETAILED DESCRIPTION OF INVENTION

Hereinafter, the present invention is described in detail based on an embodiment shown in the figures.

Figure 1:
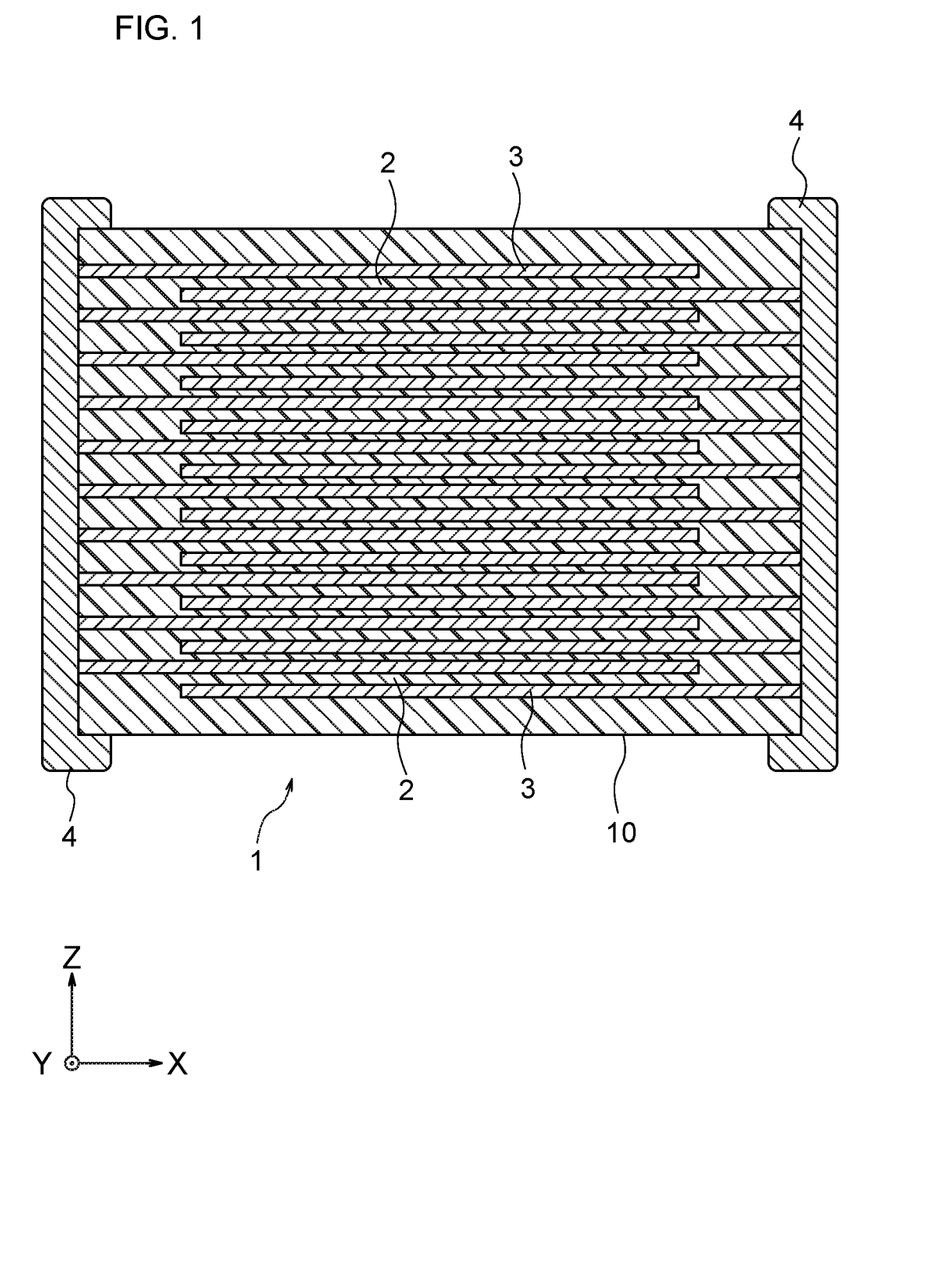
FIG. 1 is a cross-sectional view of a multilayer ceramic electronic component according to an embodiment of the present invention.

In the present embodiment, a multilayer ceramic capacitor 1 shown in FIG. 1 is described as one type of multilayer ceramic electronic components according to the present invention. As shown in FIG. 1, the multilayer ceramic capacitor 1 according to the present invention includes an element body 10 and a pair of external electrodes 4. The element body 10 is structured by alternately laminating dielectric layers 2 and internal electrode layers 3 in the Z-axis direction. The element body 10 has any shape, but normally has a rectangular parallelepiped shape. The element body 10 also has any size and has an appropriate size based on usage.

The dielectric layers 2 are composed of a dielectric composition 20 according to the present embodiment mentioned below. The thickness of the dielectric layers 2 per layer is not limited and can be, for example, 0.5-100 μm and is preferably 10 μm or less. The lamination number of dielectric layers 2 is not limited either and can optionally be determined based on desired characteristics and usage. For example, the lamination number of dielectric layers 2 is preferably 20 or more, more preferably 50 or more.

On the other hand, the internal electrode layers 3 are laminated between the dielectric layers 2, and the lamination number of internal electrode layers 3 is determined based on the lamination number of dielectric layers 2. The thickness of the internal electrode layers 3 per layer is not limited and can be, for example, 0.3-3.0 μm.

Furthermore, the internal electrode layers 3 are laminated so that their ends are alternately exposed to two end surfaces of the element body 10 facing each other in the X-axis direction. The pair of external electrodes 4 is formed at both ends of the element body 10 in the X-axis direction and is electrically connected with the exposed ends of the internal electrode layers 3 alternately arranged. A capacitor circuit is formed with the external electrodes 4 and the internal electrode layers 3 formed in such a manner.

In other words, the internal electrode layers 3 function as a part of the capacitor circuit to apply a voltage to each of the dielectric layers 2. That is, the internal electrode layers 3 are formed by containing a conductive material. The type of the conductive material is optional, but in the present embodiment, since the dielectric layers 2 are composed of a reduction resistance material, the conductive material is preferably Ni or a Ni based alloy. When the main component of the internal electrode layers 3 is Ni or a Ni based alloy, the internal electrode layers 3 may contain one or more sub components for internal electrode layers selected from Mn, Cu, Cr, etc. In addition to the above-mentioned conductive material, the internal electrode layers 3 may also contain a ceramic component contained in the dielectric layers 2 as an inhibitor and may also contain a small amount of non-metallic components, such as S and P.

The external electrodes 4 also contain a conductive material, and their material and thickness are not limited. For example, the external electrodes 4 can be baked electrodes of conductive paste, conductive resin electrodes containing thermosetting resin or so, electrodes formed by plating, electrodes formed by sputtering, or multilayer electrodes formed by laminating a plurality of electrode layers. The external electrodes 4 contain any conductive material with electrical conductivity, such as Ni, Cu, Sn, Ag, Pd, Pt, Au, and an alloy including at least one element selected from them.

Figure 2:
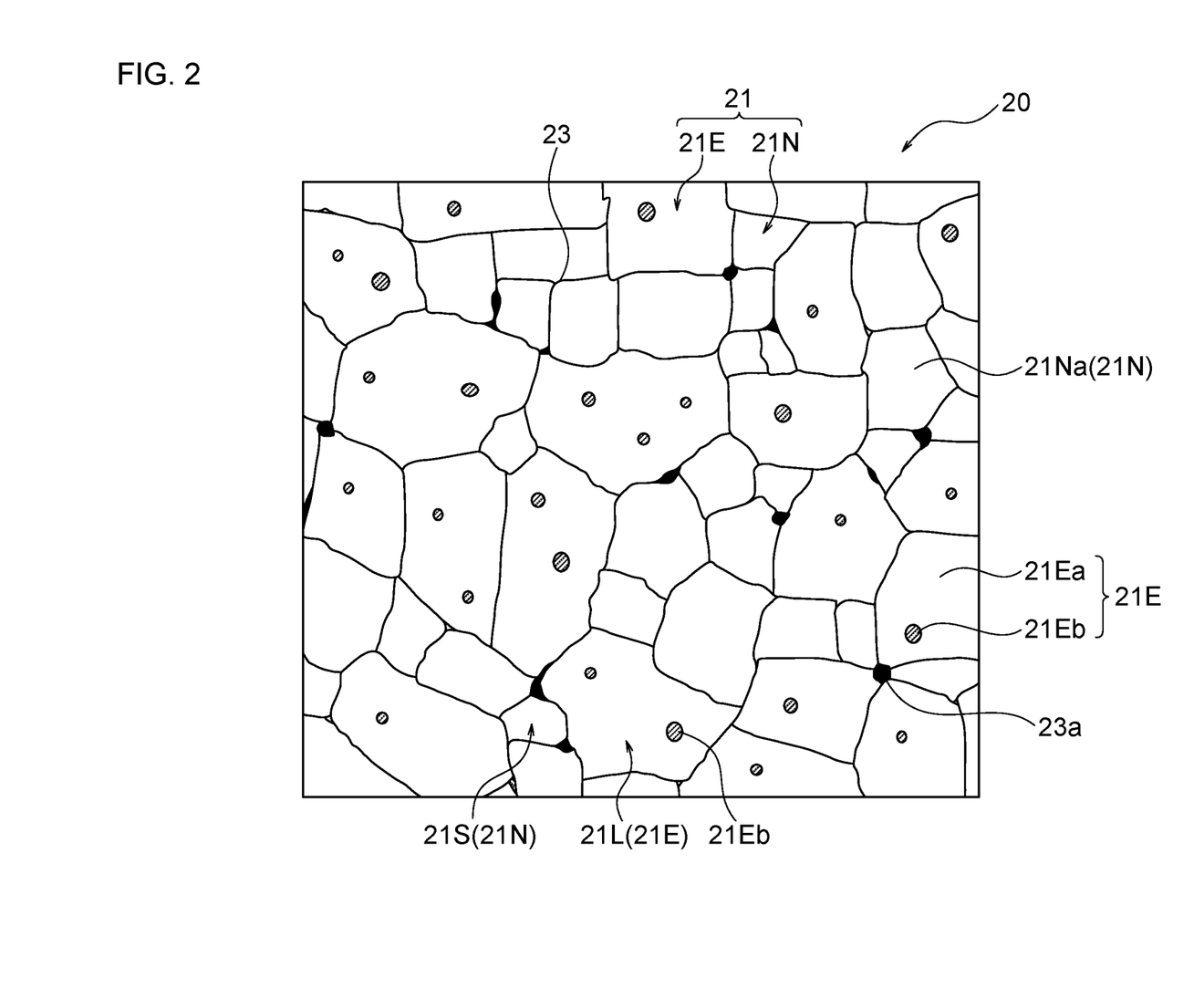
FIG. 2 is an enlarged cross-sectional view of a main part of dielectric layers shown in FIG. 1.

Next, the dielectric composition 20 constituting the dielectric layers 2 is explained based on FIG. 2.

FIG. 2 is a cross-sectional view of a main part of the dielectric layers 2, namely, a cross-sectional view of the dielectric composition 20 according to the present embodiment. As shown in FIG. 2, the dielectric composition 20 according to the present embodiment includes dielectric particles 21 and grain boundaries 23, which are interfaces existing among the dielectric particles 21. The dielectric particles 21 include: first particles 21E containing secondary phases 21Eb; and second particles 21N containing no secondary phases. In a cross section of the dielectric composition 20, an area ratio occupied by the first particles 21E (that is, $A_E/A$) is at least 5% or more and is preferably 30-80%, more preferably 30-60%.

First, the first particles 21E containing the secondary phases 21Eb are explained. Each of the first particles 21E includes: a main phase 21Ea composed of a dielectric compound; and a secondary phase 21Eb. The secondary phase 21Eb exists inside the main phase 21Ea and is surrounded by the main phase 21Ea. In the cross section of the dielectric composition 20 shown in FIG. 2, each of the first particles 21E can include one to ten secondary phases 21Eb per one particle and preferably includes one to five secondary phases 21Eb per one particle.

In the cross section shown in FIG. 2, an average particle size of the secondary phases 21Eb is preferably 10-100 nm, more preferably 30-100 nm. A particle size of the secondary phase 21Eb is measured as a circle equivalent diameter in the cross section shown in FIG. 2, and an average particle size of the secondary phases 21Eb is obtained by measuring circle equivalent diameters of at least 30 secondary phases 21Eb.

As a main component, the main phases 21Ea of the first particles 21E containing the secondary phases 21Eb include a compound with a perovskite structure represented by a general formula of $ABO_3$. Specifically, the main component of the main phases 21Ea is preferably a barium titanate represented by a composition formula of $Ba_mTiO_{2+m}$. The barium titanate represented by the composition formula has a perovskite crystal structure having a tetragonal or cubic system at room temperature. In the above-mentioned composition formula, "m" means a molar ratio of A-site atoms to B-site atoms (AB ratio). In the present embodiment, $1.01 \leq m \leq 1.15$ is preferably satisfied, and $1.05 \leq m \leq 1.15$ is more preferably satisfied.

In the above-mentioned composition formula, the A-site atoms are Ba only, but in addition to Ba, strontium (Sr) and/or calcium (Ca) may be contained. In the main phases 21Ea, however, it is preferred that Sr and Ca are just contained as unavoidable impurities and are not actively contained. In other words, the main component of the main phases 21Ea is preferably $Ba_mTiO_{2+m}$ (BT), not barium calcium titanate (BCT: $(Ba, Ca)TiO_3$), barium strontium titanate (BST: $(Ba, Sr)TiO_3$), or the like. Specifically, when the number of A-site atoms is 100 at %, a ratio of Ca and Sr atoms in the A-site is preferably 0.3 at % or less.

In the above-mentioned composition formula, the B-site atoms are Ti only, but in addition to Ti, zirconium (Zr) and/or hafnium (Hf) may be contained. In the main phases 21Ea, however, it is preferred that Zr and Hf are just contained as unavoidable impurities and are not actively contained. In other words, the main component of the main phases 21Ea is preferably $Ba_mTiO_{2+m}$ (BT), not barium zirconate titanate (BZT: $Ba(Ti, Zr)O_3$), barium hafnium titanate ($Ba(Ti, Hf)O_3$), or the like. Specifically, when the number of B-site atoms is 100 at %, the ratio of Zr and Hf atoms in the B-site is preferably 0.8 at % or less.

The identification of the components and the main component of the main phases 21Ea can be analyzed by an electron probe micro analyzer (EPMA) or X-ray fluorescence analysis (XRF). In the present embodiment, when a component analysis is carried out with an EPMA, an energy dispersive spectrometer (EDS) or a wavelength dispersive spectrometer (WDS) can be used as an X-ray spectrometer.

The secondary phases 21Eb are Ba-rich phases whose Ba content ratio is higher than that of the main phases 21Ea. In addition to Ba, the secondary phases 21Eb may contain Ti and oxygen (O), which are constituent elements of the main phases 21Ea, as well as other sub-component elements and impurity elements. In the present embodiment, "Ba-rich" means that a Ba/Ti ratio is higher than that of the main phases 21Ea. Specifically, in the secondary phases 21Eb, a ratio of a Ba element content to a Ti element content (Ba/Ti ratio) is 1.2 or more, preferably 1.2-2.0, more preferably 1.4-1.9, in terms of atomic number ratio. As mentioned above, a Ba/Ti ratio (i.e., "m" in the composition formula) is substantially 1.0 in the main phases 21Ea, but Ba is excessively contained in the secondary phases 21Eb.

$Ba_2TiO_4$, which has a monoclinic system, is exemplified as the secondary phases 21Eb with the above-mentioned characteristics.

In the present embodiment, the secondary phases 21Eb are analyzed by observing a cross section of the dielectric composition 20 as shown in FIG. 2 with a scanning transmission electron microscope (STEM). For example, when a cross section of the dielectric composition 20 is observed in a bright field image of the STEM, the secondary phases 21Eb, which are Ba-rich phases, can be recognized as darker contrasts inside the dielectric particles 21. This is because elements with larger atomic numbers appear darker in the bright field image of the STEM.

The Ba/Ti ratio of the secondary phases 21Eb can be measured by point analysis of dark contrast areas with by an EPMA. Particle sizes of the secondary phases 21Eb are obtained by measuring circle equivalent diameters of dark contrast areas by image analysis.

After identifying particles in which the secondary phases 21Eb exist in a cross-sectional photograph by the above-mentioned manner, the area ratio occupied by the first particles 21E including the secondary phases 21Eb is calculated as a ratio ($A_E/A$) of an area $A_E$ occupied by the particles (first particles 21E) to an area A of the measurement visual field (an area of the cross-sectional photograph). At this time, the magnification during observation is preferably 10,000-1,000,000 times, and the size of the measurement visual field is preferably a size corresponding with 0.1-10 μm square. Preferably, the area ratio occupied by the first particles 21E is calculated as an average value by performing the above-mentioned image analysis in at least three or more visual fields.

When the above-mentioned cross-sectional observation is carried out in a dark field image (DF image) of the STEM, the bright and dark contrasts are reversed, and the secondary phases 21Eb can be recognized as brighter contrasts in particle. In the above-mentioned cross-sectional observation, a sample for observation is prepared by mirror polishing a cross section of the element body 10 shown in FIG. 1 and thereafter obtaining a thin sample from the dielectric layers 2 by the micro-sampling method using a focused ion beam (FIB). Preferably, the thin sample has a thickness of about 100 nm. The measurement conditions during the cross-sectional observation, such as measurement magnification and acceleration voltage, are appropriately determined based on normal analysis techniques so that fine particles of 100 nm or less can be analyzed.

As mentioned above, each of the first particles 21E shown in FIG. 2 includes: the main phase 21Ea having a main component of barium titanate; and the Ba-rich secondary phase 21Eb. In contrast, each of the second particles 21N shown in FIG. 2 includes no secondary phase and includes a main phase 21Na composed of a dielectric compound. The main component of the main phases 21Na of the second particles 21N can be a compound different from the main phases 21Ea of the first particles 21E and may be, for example, BCT or BZT. As with the first particles 21E, however, the main component of the main phases 21Na of the second particles 21N is preferably a barium titanate represented by the composition formula of $Ba_mTiO_{2+m}$.

At least one of the first particles 21E or the second particles 21N may have a core-shell structure, and a diffusion phase (shell: not shown) whose composition is different from that of the main phases 21Ea or 21Na may exist at the periphery of the main phases 21Ea and 21Na.

In the dielectric composition 20 of the present embodiment, the dielectric particles 21 can have a D50 of 0.05-2 μm and preferably have a D50 of 0.1-1 μm. If the dielectric particles 21 are classified by particle size, the dielectric particles 21 preferably include large particles 21L with a particle size of 0.5 μm or more and small particles 21S with a particle size of less than 0.5 μm. The above-mentioned particle size of the dielectric particles 21 means a circle equivalent diameter in a cross section of the dielectric composition 20 as shown in FIG. 2.

When the dielectric particles 21 includes the large particles 21L and the small particles 21S, an area ratio occupied by the large particles 21L in a cross section of the dielectric composition 20 is preferably 50% or more, more preferably 50-90%. As with the measurement of the area ratio of the first particles 21E, the area ratio occupied by the large particles 21L is calculated by image analysis of a cross-sectional photograph obtained by STEM. Specifically, the area ratio occupied by the large particles 21L is calculated as a ratio ($A_L/A$) of an area $A_L$ occupied by the large particles 21L to an area A of the measurement visual field after classifying the dielectric particles 21 into the large particles 21L and the small particles 21S based on circle equivalent diameter in a cross-sectional photograph. At this time, the magnification during observation is preferably 10,000 to 1,000,000 times, and the size of the measurement visual field is preferably a size corresponding with 0.1-10 μm square. The area ratio of the large particles 21L is calculated as an average value by performing the above-mentioned image analysis in at least three visual fields. The magnification during observation is appropriately adjusted based on the size of particles to be observed. An area ratio ($A_S/A$) occupied by the small particles 21S can be calculated in the same manner as above.

When the dielectric particles 21 are classified by particle size as mentioned above, the Ba-rich secondary phases 21Eb may exist inside the small particles 21S, but particularly preferably exist inside the large particles 21L rather than inside the small particles 21S.

Specifically, an area ratio ($A_{LE}/A_L$) of an area $A_{LE}$ occupied by the large particles 21L including the secondary phases 21Eb to an area $A_L$ occupied by the large particles 21L in a cross section of the dielectric composition 20 as shown in FIG. 2 is preferably 50% or more, more preferably 50-90%, even more preferably 50-80%.

Meanwhile, an area ratio ($A_{SE}/A_S$) of an area $A_{SE}$ occupied by the small particles 21S including the secondary phases 21Eb to an area $A_S$ occupied by the small particles 21S in a cross section of the dielectric composition 20 can be 0-60% and is preferably 0-10%, more preferably 0% (i.e., substantially no secondary phases 21Eb are observed inside the small particles 21S).

The area ratio ($A_{LE}/A_L$) of the large particles 21L including the secondary phases 21Eb is calculated by measuring the area $A_L$ occupied by the large particles 21L in a cross-sectional observation similar to the above-mentioned one, identifying the large particles 21L including the secondary phases 21Eb among the large particles 21L contained in the measurement visual field, and measuring the area $A_{LE}$ of these particles. The area ratio ($A_{SE}/A_S$) occupied by the small particles 21S including the secondary phases 21Eb can be calculated in the same manner as above. In the above, "the large particles 21L including the secondary phases 21Eb" and "the small particles 21S including the secondary phases 21Eb" mean that the large particles 21L or the small particles 21S are the first particles 21E mentioned above.

The basic structure of the dielectric composition 20 according to this embodiment is described above. The dielectric composition 20 may additionally contain a sub component. For example, the sub component is an oxide including a rare earth element. The rare earth element is at least one selected from Sc, Y, La, Ce, Pr, Nd, Pm, Sm, Eu, Gd, Tb, Dy, Ho, Er, Tm, Yb, and Lu. When such a sub component is contained, the rare earth element may partially be solid-soluted near grain boundaries of the dielectric particles 21 (i.e., the periphery of the main phases) to form diffusion phases (shells). The rare earth element may be segregated in the grain boundaries 23. In this case, grain-boundary segregation phases 23a including the rare earth element are formed in the grain boundaries 23.

As a sub component, an oxide including at least one selected from Mg, Mn, Cr, Co, V, Ta, Nb, Mo, and W may also be contained. These metallic elements may function as donors or acceptors in the dielectric composition 20. This sub component improves characteristics, such as high temperature load life.

In addition, as a sub component that also functions as a sintering agent, an oxide including at least one selected from Si, Li, Al, Ge, and B may be contained. These elements may react with elements contained in the dielectric particles 21 (e.g., Ti, Ba) to form grain boundary phases (not shown) in the grain boundaries 23. These elements may be segregated in the grain boundaries 23. In this case, a composite oxide including Si, Al, etc. is formed as the grain-boundary segregation phases 23a in the grain boundaries 23.

As mentioned above, grain boundary phases including the sub component elements may exist in the grain boundaries 23, and the grain-boundary segregation phases 23a, such as segregation including rare earth elements and segregation including sintering agent, may exist. Preferably, however, the Ba-rich secondary phases 21Eb do not exist in the grain boundaries 23, but exist only inside the dielectric particles 21.

Next, a method of manufacturing the multilayer ceramic capacitor 1 shown in FIG. 1 is explained. In the present embodiment, this method is explained when the large particles 21L are the first particles 21E including the secondary phases 21Eb and the small particles 21S are the second particles 21N including no secondary phases.

First, a raw material powder for first particles and a raw material powder for second particles are prepared as dielectric raw materials.

The raw material powder for first particles is prepared by solid-phase method. In solid-phase method, barium carbonate ($BaCO_3$) and titanium oxide ($TiO_2$) are uniformly mixed by wet mixing or so and thereafter calcined to obtain a raw material powder of barium titanate (composition formula: $Ba_mTiO_{2+m}$). There may appropriately be a dry step or so between the wet mixing and the calcination. In the preparation of the raw material powder by solid-phase method, barium carbonate ($BaCO_3$) and titanium oxide ($TiO_2$) are normally mixed so that their mixing ratio (molar ratio: $BaCO_3/TiO_2$) is approximately 1.0. In the preparation of the raw material powder for first particles, the starting raw materials are mixed so that $BaCO_3$ is excessive by increasing the mixing ratio of $BaCO_3$ to $TiO_2$ to larger than 1.0.

In the preparation of the raw material powder for first particles, the temperature is retained at a high temperature of 1250° C. or more during the calcination and is thereafter slowly cooled to 1000° C. at a rate of 100° C./hour or less (hereinafter, a calcination under these conditions is referred to as a "high temperature—slow cooling firing"). If the raw material powder for first particles is heated at the high temperature after excessively adding a Ba starting raw material, the constituent particles of this raw material powder become a supersaturated solid solution in which Ba is solid-soluted in excess of the stoichiometric ratio ($BaTiO_3$) in the high temperature state during heating. Then, the temperature is slowly cooled with the above-mentioned conditions, and secondary phases (phases that finally become the secondary phases 21Eb) whose Ba ratio is higher than that of the stoichiometric ratio are deposited inside particle of $BaTiO_3$. As the raw material powder for first particles, the $BaTiO_3$ powder subjected to the high temperature—slow cooling firing is used. In the high temperature—slow cooling firing, the retaining temperature is preferably 1250-1460° C., more preferably 1300-1460° C. Preferably, the temperature retaining time is 0.5-4 hours.

The cooling rate is preferably 100° C./hour or less, more preferably 50° C./hour or less.

The raw material powder for first particles may not be pulverized after the high temperature—slow cooling firing. Even if the raw material powder for first particles is pulverized, the pulverization conditions are preferably determined so that the coarse lumps are crushed. Specifically, the raw material powder for first particles preferably has a D50 of 0.3 μm or more and more preferably has a D50 of 0.3-1 μm. When the D50 is in such a range, the raw material powder for first particles becomes the large particles 21L after a main firing mentioned below.

Meanwhile, the raw material powder for second particles can be manufactured by various liquid-phase methods (e.g., oxalate method, hydrothermal synthesis method, alkoxide method, sol-gel method) in addition to solid-phase method. When the raw material powder for second particles is manufactured by solid-phase method, the mixing ratio of $BaCO_3$ to $TiO_2$ is approximately 1.0. In the calcination conditions, the retaining temperature is 900-1250° C., the retaining time is 0.5-4 hours, and the cooling rate is about 150-500° C./hour.

Preferably, the raw material powder for second particles is pulverized using various pulverizers, such as ball mill, so as to have a D50 of less than 0.3 μm. More preferably, the raw material powder for second particles has a D50 of 0.03 μm or more and less than 0.3 μm. When the D50 is in such a range, the raw material powder for second particles becomes the small particles 21S after a main firing mentioned below. The raw material powder for second particles may partly become the large particles 21L by grain growth of particles bonded with each other in the preparation process.

Next, the raw material powder for first particles and the raw material powder for second particles prepared in the above-mentioned manner are mixed to obtain a mixed powder. At this time, a ratio of the large particles 21L in the dielectric composition to be obtained (i.e., an area ratio in a cross section) can be adjusted by adjusting a blending ratio of the raw material powder for first particles and the raw material powder for second particles.

When a sub component is added to the dielectric composition 20, a raw material for sub component is added in this mixing step. The raw material for sub component can be an oxide or composite oxide containing the above-mentioned sub-component elements or a compound that becomes an oxide after firing, such as carbonate, oxalate, nitrate, hydroxide, and organometallic compound. The raw material for sub component has any particle size, but is preferably a powder having an average particle size of about 10-200 nm. In this mixing step, the mixing method is not limited. For example, when a wet method is employed, a mixed powder is sufficiently dried after mixing.

Next, an organic vehicle is added to the mixed powder obtained above and kneaded to obtain a paste for dielectric layers. Here, the organic vehicle is a binder dissolved in an organic solvent. The binder to be used is not limited and is appropriately selected from various binders, such as ethyl cellulose and polyvinyl butyral. The organic solvent to be used is not limited either and can appropriately be selected from various organic solvents, such as terpineol, butyl carbitol, acetone, and toluene.

The above-mentioned paste for dielectric layers is an organic paint, but may be a water-based paint obtained by kneading the mixed powder and a water-based vehicle. In this case, the water-based vehicle is prepared by dissolving a water-soluble binder, a dispersant, or the like in water. The water-soluble binder to be used is not limited either and can be polyvinyl alcohol, cellulose, water-soluble acrylic resin, or the like.

In addition to the paste for dielectric layers, a paste for internal electrodes constituting the internal electrode layers 3 after the main firing is also prepared. The paste for internal electrodes is prepared by kneading the above-mentioned conductive material made of Ni or Ni alloy or various oxides, organometallic compounds, resinates, or the like that become Ni or Ni alloy mentioned above after the main firing together with the above-mentioned organic vehicle. At this time, a ceramic component contained in the paste for dielectric layers (preferably, a barium titanate that is the same as the main component) may be added as an inhibitor to the paste for internal electrodes.

The vehicle content in each of the above-mentioned pastes is not limited. For example, the binder content can be about 4-10 parts by weight, and the solvent content can be about 60-100 parts by weight, with respect to 100 parts by weight of the mixed powder of the dielectric raw material. If necessary, each paste may contain additives, such as dispersant, plasticizer, and insulator. In this case, preferably, the total amount of the additives is 10 parts by weight or less with respect to 100 parts by weight of the mixed powder of the dielectric raw material.

Next, a green chip to be the element body 10 after the main firing is manufactured using the above-mentioned pastes. The green chip can be manufactured by various printing methods or various sheet methods.

For example, when the green chip is manufactured by a sheet method, the paste for dielectric layers is firstly applied on a carrier film, such as PET, to form a sheet and appropriately dried to obtain a green sheet. Then, the paste for internal electrodes is applied on the green sheet in a predetermined pattern by various printing methods, such as screen printing. After laminating a plurality of these sheets, a mother laminated body is obtained by pressing in the lamination direction. At this time, the green sheets are laminated so that only the dielectric layer is located on the upper surface and the lower surface of the mother laminated body in the lamination direction. Then, the mother laminated body obtained by the above-mentioned step is cut by dicing or push-cutting to obtain a plurality of green chips.

Next, the green chips are subjected to a binder removal treatment. As the conditions for the binder removal treatment, the heating rate is preferably 5-300° C./hour, the retaining temperature is preferably 180-900° C., and the temperature retaining time is preferably 0.5-48 hours. The atmosphere of the binder removal treatment is an air atmosphere or a reducing atmosphere.

After the binder removal treatment, the green chips are fired (main firing). In the main firing step of the present embodiment, the heating rate is preferably 100° C./hour or more. The upper limit of the heating rate is not limited, but the heating rate is preferably 5000° C./hour or less so that the load on the apparatus is not excessive. The retaining temperature during the main firing is preferably 1100° C. or more and 1250° C. or less, more preferably 1150-1250° C. The temperature retaining time is preferably 0.2-3 hours, more preferably 0.5-2 hours. In the cooling step after retaining the temperature, the cooling rate is preferably 50-300° C./hour.

In the main firing, a reducing atmosphere is preferable, and the atmosphere gas can be, for example, a humidified mixed gas of nitrogen ($N_2$) and hydrogen ($H_2$). The oxygen partial pressure during the main firing is appropriately determined based on the type of the conductive material in the paste for internal electrodes. When a base metal, such as Ni and Ni alloy, is used as the conductive material, the oxygen partial pressure is preferably $1.0 \times 10^{-15}$ to $1.0 \times 10^{-10}$ MPa.

The element body 10 is obtained by carrying out the main firing under the above-mentioned conditions. In the present embodiment, preferably, the element body 10 after firing is subjected to an annealing treatment (an oxidation treatment of the dielectric layers). In the oxidation treatment, the retaining temperature is preferably 1100° C. or less, more preferably 900-1090° C. The temperature retaining time in the oxidation treatment can be 0-20 hours and is preferably 2-4 hours. In the oxidation treatment, preferably, the atmosphere is a nitrogen atmosphere or a humidified nitrogen atmosphere, and the oxygen partial pressure is $1.0 \times 10^{-9}$ to $1.0 \times 10^{-5}$ MPa.

The binder removal treatment, the main firing, and the oxidation treatment may be performed continuously or independently. These heat treatment steps (binder removal treatment, main firing, and oxidation treatment) may be performed on the mother laminated body before cutting, and the mother laminated body may be cut after the heat treatment steps to obtain a plurality of element bodies 10. The obtained element bodies 10 may appropriately be subjected to an end surface treatment, such as polishing and blasting.

Here, a method of controlling the particle size or amount of the secondary phases 21Eb is supplemented. The particle size and amount of the secondary phases 21Eb can be controlled by conditions in the high temperature—slow cooling firing, such as the mixing ratio of $BaCO_3$ to $TiO_2$ and the retaining temperature. For example, the larger the mixing ratio of the starting raw materials (molar ratio: $BaCO_3$/$TiO_2$) is, the higher the amount of the secondary phases 21Eb tends to be. The higher the retaining temperature during the high temperature—slow cooling firing is, the larger the amount of Ba solid-soluted in particle in the high temperature state during heating becomes, and the larger the particle size of the secondary phases 21Eb deposited in the slow-cooling step becomes. Instead, the faster the cooling rate during the high temperature—slow cooling firing is, the more easily the supersaturated state of Ba is maintained, and the smaller the particle size of the secondary phases 21Eb to be deposited tends to become.

In the mixing step, when the blending ratio of the raw material powder for first particles is large, the amount of the secondary phases 21Eb tends to become large. The conditions in each heat treatment step (binder removal treatment, main firing, and oxidation treatment) also affect the particle size and amount of the secondary phases 21Eb. For example, when the heat treatment temperature in the main firing or so is high, it is considered that the secondary phases excessively containing Ba easily grow to cause the secondary phases 21Eb deposited in particle to have a large particle size.

As a method of manufacturing the dielectric raw material, various liquid-phase methods are known in addition to solid-phase methods, but it is considered that the formation of the secondary phases 21Eb, which is the target of the present embodiment, is difficult by liquid-phase methods. This is probably because a supersaturated solid solution excessively containing Ba cannot be formed due to a lower treatment temperature of liquid-phase methods compared to that of solid-phase methods. There is also a method of adding a compound containing Ba as a sub component separately from the dielectric raw material. Even in this case, it is considered difficult to form the secondary phases 21Eb. That is, when a compound containing Ba is added separately from the dielectric raw material, it is considered difficult to form the Ba-rich secondary phases 21Eb because segregations containing Ba are formed as the grain-boundary segregation phases 23a in the grain boundaries 23.

Finally, the pair of external electrodes 4 is formed at the ends of the element body 10 obtained by the above-mentioned method. The external electrodes 4 are formed by any method and may be formed by, for example, baking a conductive paste. Instead, the external electrodes 4 may be formed as conductive resin electrodes by applying a conductive paste containing a thermosetting resin and curing the paste with heating. In addition, the external electrodes 4 can be formed by a film forming method, such as plating and sputtering. The external electrodes 4 may be laminated electrodes obtained by forming a single or a plurality of plating layers on the surface of a sintered electrode or a conductive resin electrode. The multilayer ceramic capacitor 1 shown in FIG. 1 can be obtained with the external electrodes 4 formed in such a manner.

The multilayer ceramic capacitor 1 according to the present embodiment manufactured by the above-mentioned method is mounted on a substrate, such as circuit board, by solder, conductive adhesive, or the like and is used for various electronic devices.

SUMMARY OF EMBODIMENT

As the dielectric particles 21, the dielectric composition 20 according to the present embodiment includes the first particles 21E containing: the main phases 21Ea having a main component of barium titanate; and the secondary phases 21Eb having a higher Ba content ratio than the main phases 21Ea. In the first particles 21E, the secondary phases 21Eb exist inside the main phases 21Ea, namely, inside the first particles 21E.

As mentioned above, it is considered that the existence of the Ba-rich secondary phases 21Eb inside at least one of the dielectric particles 21 causes cracks growing in particle to stop at the secondary phases 21Eb and can prevent the cracks from growing in particle. As a result, the dielectric composition 20 according to the present embodiment can prevent the occurrence of cracks even if a stress is applied from the outside and has an improved mechanical strength. The dielectric composition 20 according to the present embodiment has the above-mentioned structure and thereby prevents the occurrence of cracks and has a high relative permittivity.

In the present embodiment, the secondary phases 21Eb have a particle size of 10 nm or more and 100 nm or less. Since the secondary phases 21Eb have a particle size of 10 nm or more, cracks are prevented sufficiently, and the mechanical strength of the dielectric composition 20 is further improved. Since the secondary phases 21Eb have a particle size of 100 nm or less, a higher relative permittivity is obtained.

In the present embodiment, a ratio of a Ba content to a Ti content in the secondary phases 21Eb is 1.2-2.0. Since the composition of the secondary phases 21Eb satisfies this ratio, the high temperature load life of the dielectric composition 20 is further improved.

In a cross section of the dielectric composition 20 according to the present embodiment, an area ratio ($A_E/A$) of the first particles 21E including the secondary phases 21Eb is 30-80%. Since the content ratio of the first particles 21E is in such a range, the mechanical strength of the dielectric composition 20 is further improved, and the relative permittivity is also further improved.

In the present embodiment, the dielectric particles 21 include the large particles 21L having a circle equivalent diameter of 0.5 μm or more and the small particles 21S having a circle equivalent diameter of less than 0.5 μm. In particular, the secondary phases 21Eb exist inside the main phases of the large particles 21L. The dielectric composition 20 according to the present embodiment has the above-mentioned structure and thereby has a further improved high temperature load life. In a cross section of the dielectric composition 20, an area ratio ($A_{LE}/A_L$) of an area $A_{LE}$ occupied by the large particles 21L including the secondary phases 21Eb to an area $A_L$ occupied by the large particles 21L is 50% or more. Since the ratio of the large particles 21L including the secondary phases 21Eb is in such a range, the dielectric composition 20 according to the present embodiment has a further improved mechanical strength, and the relative permittivity tends to be further improved.

In a cross section of the dielectric composition 20 according to the present embodiment, an area ratio ($A_L/A$) occupied by the large particles 21L is 50-90%. Since the content ratio of the large particles 21L is in such a range, the high temperature load life of the dielectric composition 20 is further improved.

Hereinbefore, an embodiment of the present invention is explained, but the present invention is not limited to the above-mentioned embodiment and can variously be modified within the scope of the present invention. For example, the present embodiment explains a multilayer ceramic capacitor, but the multilayer ceramic electronic component according to the present invention may be a composite element, such as an LC composite component having both a coil region and a capacitor region.

EXAMPLES

Hereinafter, the present invention is explained based on further detailed examples, but is not limited to the following examples.

Experiment 1

Example 1

In Example 1, a $BaTiO_3$ powder subjected to high temperature—slow cooling firing in a state where Ba was excessive was prepared as a dielectric raw material, and capacitor samples were prepared using the dielectric raw material. Hereinafter, a procedure for manufacturing the capacitor samples according to Example 1 is described.

First, a $BaCO_3$ powder and a $TiO_2$ powder were prepared as starting raw materials and weighed so that the $BaCO_3$ powder would be in excess of stoichiometric ratio with respect to the $TiO_2$ powder. Then, the weighed starting materials were wet-mixed with a ball mill for 24 hours and thereafter dried. After drying, the mixed starting raw materials were subjected to high temperature—slow cooling firing within the conditions described in the embodiment (retaining temperature: 1250° C. or more, cooling rate to 1000° C.: 50° C./hour or less). In this step, a raw material powder for first particles was obtained. The raw material powder for first particles after high temperature—slow cooling firing was crushed so as to have a D50 of about 0.5 μm.

Next, a paste for dielectric layers was prepared using the raw material powder for first particles obtained above. In Example 1, only the above-mentioned raw material powder for first particles subjected to high temperature—slow cooling firing was used as a dielectric raw material, and a $SiO_2$ powder, a $Al_2O_3$ powder, a MgO powder, a $MnCO_3$ powder, a $Dy_2O_3$ powder, and a $V_2O_5$ powder were added as sub-component raw materials to the dielectric raw material and wet-mixed. Each addition amount of the sub-component raw materials was 3.0 parts by mol of the $SiO_2$ powder, 0.3 parts by mol of the $Al_2O_3$ powder, 0.2 parts by mol of the MgO powder, 0.4 parts by mol of the $MnCO_3$ powder, 2.5 parts by mol of the $Dy_2O_3$ powder, and 0.05 parts by mol of the $V_2O_5$ powder, with respect to 100 parts by mol of the dielectric raw material. A mixed powder containing the dielectric raw material and the sub-component raw materials was obtained by sufficiently drying the starting raw materials after the wet mixing.

Then, polyvinyl butyral resin: 8 parts by weight, dioctylphthalate as a plasticizer: 5 parts by weight, dispersant: 1 part by weight, and MEK as a solvent: 80 parts by weight were added to 100 parts by weight of the obtained mixed powder and kneaded with a ball mill to obtain a paste for dielectric layers. Apart from the above, a paste for internal electrodes containing Ni as a conductive material was also prepared. The paste for internal electrodes was obtained by kneading Ni powder: 44.6 wt. %, terpineol: 52 wt. %, ethyl cellulose: 3 wt. % by weight, and benzotriazole as a corrosion inhibitor: 0.4 wt. % in a three-roll mill.

Next, a green sheet was obtained by applying the prepared paste for dielectric layers onto a PET film to form a sheet. Next, the paste for internal electrodes was printed on the green sheet in a predetermined pattern, and this green sheet was peeled off from the PET film. Next, green sheets on which the internal electrode pattern was printed were laminated and bonded with pressure to obtain a mother laminated body. In addition, green chips were obtained by cutting the mother laminated body to a predetermined size.

Next, the obtained green chips were subjected to a binder removal treatment, a firing, and an oxidation treatment to obtain element bodies 10 as sintered bodies. The detailed conditions for each of these heat treatment steps were as follows.

The conditions for the binder removal treatment were heating rate: 50° C./hour, retaining temperature: 235° C., temperature retaining time: 6 hours, and atmosphere: air.

The conditions for the firing were heating rate: 200° C./hour, retaining temperature: 1200° C., temperature retaining time: 1 hour, cooling rate: 200° C./hour or more, atmospheric gas: humidified $N_2+H_2$ mixed gas, and oxygen partial pressure: $1.0 \times 10^{-12}$ MPa.

The conditions for the annealing treatment were retaining temperature: 1050° C., retaining time: 2 hours, atmospheric gas: humidified $N_2$ gas, and oxygen partial pressure: $1.0 \times 10^{-7}$ MPa. In the firing and the annealing treatment, a wetter was used for humidifying the atmospheric gas.

After polishing the end surfaces of the obtained element bodies 10 by sandblasting, an In—Ga eutectic alloy was applied as external electrodes to obtain capacitor samples having the same shape as multilayer ceramic capacitors 1 shown in FIG. 1. The size of the obtained capacitor samples (size of the element bodies 10) was 1.6 mm×0.8 mm×0.8 mm, the thickness of the dielectric layers was 5.0 μm, the thickness of the internal electrode layers was 1.5 μm, and the number of dielectric layers sandwiched between the internal electrode layers was 50.

Example 2

In Example 2, a dielectric raw material was prepared by mixing the raw material powder for first particles prepared in Example 1 and a raw material powder for second particles, and capacitor samples were prepared using this dielectric raw material.

Specifically, the raw material powder for second particles in Example 2 was obtained by mixing a $BaCO_3$ powder and a $TiO_2$ powder, which were starting raw materials, at a molar ratio of 1:1 and calcining them at a temperature of less than 1250° C. In the calcination of the raw material powder for second particles, the mixture was cooled at a rate of about 300° C./hour without slow cooling. The raw material powder for second particles was pulverized using a ball mill after the calcination to have a D50 of 0.3 μm or less.

In Example 2, the above-mentioned raw material powder for second particles and the same raw material powder for first particles subjected to high temperature—slow cooling firing as in Example 1 were mixed at a weight ratio of 1:1 and used as a dielectric raw material. The experimental conditions of Example 2 other than the above-mentioned ones were the same as those of Example 1, and capacitor samples according to Example 2 were obtained.

Example 3

In Example 3, a raw material powder for second particles was also prepared by high temperature—slow cooling firing in a state where Ba was excessive. In the preparation of the raw material powder for second particles, starting raw materials were mixed so that a $BaCO_3$ powder was in excess of a $TiO_2$ powder, and the starting raw materials were subjected to high temperature—slow cooling firing with the same conditions as those of a raw material powder for first particles. In Example 3, the raw material powder for first particles (similar to that of Example 1) and the raw material powder for second particles mentioned above were mixed at a weight ratio of 1:1 and used as a dielectric raw material. In Example 3, both of the raw material powder for first particles and the raw material powder for second particles were prepared by high temperature—slow cooling firing, but they were powders having different particle sizes. Specifically, the D50 of the raw material powder for first particles was 0.6 and the D50 of the raw material powder for second particles was 0.1 The experimental conditions of Example 3 other than the above-mentioned ones were the same as those of Example 1, and capacitor samples according to Example 3 were obtained.

Comparative Example 1

In Comparative Example 1, a $BaTiO_3$ powder whose D50 was 0.6 μm was obtained by calcination with normal conditions without performing high temperature—slow cooling firing in the preparation of a dielectric raw material. The normal conditions were the same as the calcination conditions for the raw material powder for second particles in Example 2. The Ba/Ti ratio of the $BaTiO_3$ powder used in Comparative Example 1 was approximately 1.0. In Comparative Example 1, a paste for dielectric layers was prepared using the $BaTiO_3$ powder, and capacitor samples were obtained. The experimental conditions of Comparative Example 1 other than the above-mentioned ones were the same as those of Example 1.

Comparative Example 2

In Comparative Example 2, a $BaTiO_3$ powder whose D50 was 0.1 μm was obtained by calcination with normal conditions without performing high temperature—slow cooling firing in the preparation of a dielectric raw material. In Comparative Example 2, the conditions other than the D50 of the BaTiO$_3$ powder were the same as those of Comparative Example 1, and capacitor samples according to Comparative Example 2 were obtained.

Comparative Example 3

In Comparative Example 3, the BaTiO$_3$ powder whose D50 was 0.6 which was used in Comparative Example 1, and the BaTiO$_3$ powder whose D50 was 0.1 which was used in Comparative Example 2, were mixed at a weight ratio of 1:1, and this mixed powder was used as a dielectric raw material. That is, calcination was also performed in Comparative Example 3 with normal conditions without performing high temperature—slow cooling firing in the preparation of the dielectric raw material. The experimental conditions of Comparative Example 3 other than the above-mentioned ones were the same as those of Comparative Example 1, and capacitor samples according to Comparative Example 3 were obtained.

Comparative Example 4

In Comparative Example 4, the same mixed powder as in Comparative Example 3 was used as a dielectric material. In Comparative Example 4, however, 10 parts by mol of a BaCO$_3$ powder were added as a sub component to 100 parts by mol of the dielectric raw material (BaTiO$_3$ powder) in the preparation of a paste for dielectric layers. The experimental conditions other than the above-mentioned ones were the same as those of Comparative Example 3, and capacitor samples according to Comparative Example 4 were obtained.

In Experiment 1, the capacitor samples of Examples 1-3 and Comparative Examples 1~4 mentioned above were evaluated as below. The evaluation results are shown in Table 1.

Observation of Cross Section

In the present example, a cross section of the dielectric layers contained in the capacitor sample was observed by a STEM, and a dielectric composition constituting the dielectric layers was analyzed. In the observation of the cross section by the STEM, a sample for observation was prepared by mirror-polishing a cross section of the capacitor sample and thereafter cutting out a thin sample having a thickness of about 100 nm from the dielectric layers by a microsampling method using FIB. Then, the thin sample was observed under the conditions of magnification: 40,000 times and measurement visual field: 2.5 µm×2.5 µm, and cross-sectional photographs for three visual fields were obtained. Then, circle-equivalent diameters of the dielectric particles contained in each of the cross-sectional photographs were measured by image analysis to calculate an area ratio ($A_L/A$) occupied by large particles (circle equivalent diameter: 0.5 µm or more) and an area ratio ($A_S/A$) occupied by small particles (circle equivalent diameter: 0.5 µm or less) in each of the cross-sectional photographs. The area ratio shown in Table 1 is an average value of the three visual fields.

In the above-mentioned observation of the cross section by the STEM, whether or not the secondary phases 21Eb exist was confirmed by observation with a bright field image. Specifically, particles in which the secondary phases 21Eb exist were specified by the method described in the embodiment, and an area ratio occupied by the specified particles in the measurement visual field was calculated. Table 1 shows the measurement result as the area ratio (AWA) of first particles. After classifying the dielectric particles into the large particles and the small particles, an ratio ($A_{LE}/A_L$) of an area $A_{LE}$ of the large particles including the secondary phases 21Eb to an area $A_L$ occupied by large particles 21L and a ratio ($A_{SE}/A_S$) of an area $A_{SE}$ of the small particles including the secondary phases 21Eb to an area $A_S$ occupied by the small particles 21S were calculated by the same method as described above. As for an area ratio of particles including the secondary phases 21Eb, an average value was calculated by measuring three visual fields.

The circle equivalent diameters of the secondary phases 21Eb observed above were measured by image analysis, and an average value was calculated. In the measurement of the circle equivalent diameters of the secondary phases 21Eb, the magnification of the STEM was appropriately increased according to the size of the secondary phases 21Eb.

The components of the main phases constituting the dielectric particles were analyzed by an EPMA. As a result, it was confirmed that the main component of the main phases was BaTiO$_3$ (m≈1) in each of Examples and Comparative Examples.

(Bending Strength Test)

Figure 3:
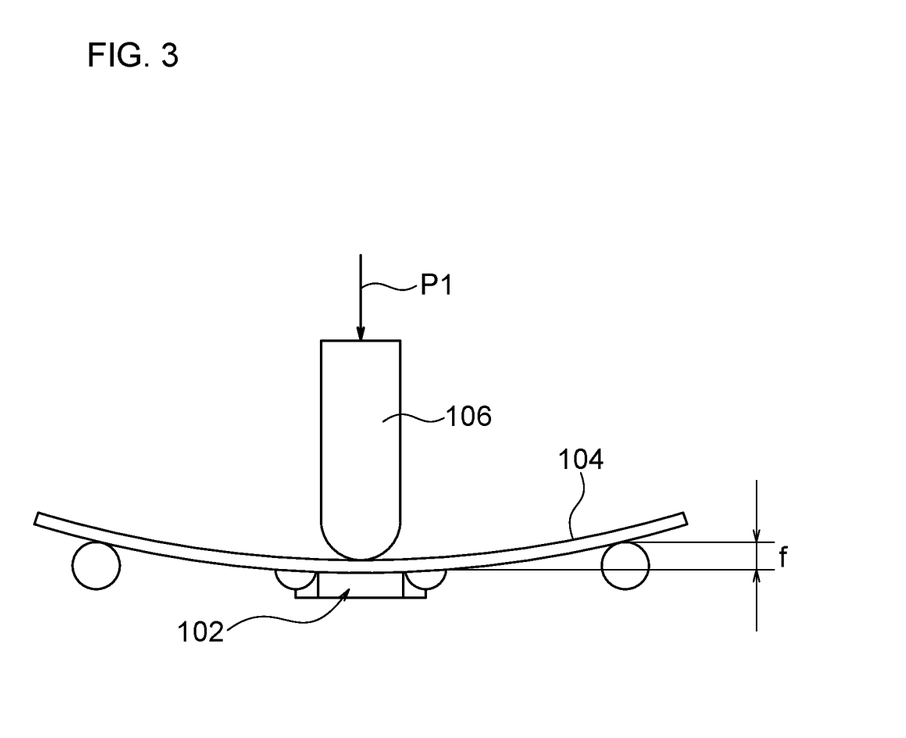
FIG. 3 is a schematic view of an apparatus for bending strength test.

A bending strength test was carried out to evaluate the mechanical strength of the dielectric composition constituting the capacitor sample. The bending strength test was carried out in the following procedure using an apparatus as shown in FIG. 3.

First, the capacitor sample was mounted on a glass cloth epoxy resin substrate (thickness: 1.6 mm) using solder. Then, the substrate after the mounting was installed on an apparatus as shown in FIG. 3, and a load was applied from a surface opposite to the surface on which the capacitor sample was soldered. At this time, the capacitor sample was connected to an LCR meter for measuring the capacitance via a lead wire. In FIG. 3, the reference numeral 102 is the capacitor sample, the reference numeral 104 is the glass cloth epoxy resin substrate, the reference numeral 106 is a pressurizing device, and the reference numeral P1 is a pressurizing direction.

In the bending strength test, a load was gradually applied while confirming whether or not a breakage, such as cracks, was generated in the capacitor sample, and a bending amount f at the time of generation of the breakage was measured. The generation of the breakage was confirmed by a breaking sound and a change rate in capacitance. Specifically, it was determined that the capacitor sample was broken when a breaking sound was generated or when the capacitance of the capacitor sample changed by 10% or more from before the test. The above-mentioned bending strength test was performed on 10 samples for each example, and an average value was calculated. A bending amount f of 5 mm or more was pass/fail criteria, and a bending amount f of 7.0 mm or more was determined to be particularly good.

(Relative Permittivity)

A relative permittivity of the capacitor sample was measured. The relative permittivity was calculated by measuring the capacitance using an LCR meter (manufactured by KEYSIGT TECHNOLOGIES: E4891A capacitance meter). In the measurement of capacitance, the measurement temperature was 20° C., and a signal with frequency: 1 kHz and input signal level (measurement voltage): 1 Vrms was input to the capacitor sample. Then, the relative permittivity (no unit) was calculated based on the thickness of the dielectric layers, the effective electrode area, and the measured capacitance. The above measurement was performed on 10 samples for each example, and an average value was calculated. In the present example, a relative permittivity of 1500 or more was pass/fail criteria, and a relative permittivity of 2000 or more was determined to be good.

(High Temperature Load Life Test)

A high temperature load life test was performed on the capacitor samples, and a mean time to failure (MTTF) was measured. In the high temperature load life test, a change with time in insulation resistance was measured at 200° C. while applying a DC voltage to the capacitor samples. At this time, the DC voltage was set to a value at which an electric field strength of 20 V/μm was applied to each of the dielectric layers. In the present example, the sample whose insulation resistance has deteriorated by an order of magnitude was determined to be a failure, and a time from the start of application to the failure was measured. The above-mentioned high temperature load life test was performed on 10 samples for each example, and an average value, that is, a mean time to failure (MTTF) was calculated. A mean time to failure of 10 hours or more was pass/fail criteria. A mean time to failure of 50 hours or more was determined to be good, and a mean time to failure of 70 hours or more was determined to be particularly good.

der), but no Ba-rich secondary phases were formed inside the dielectric particles. In Comparative Example 4, it was confirmed that grain-boundary deposition phases containing Ba existed in the grain boundaries, and five grain-boundary deposition phases were confirmed in the measurement region of 2 μm square. From the results of Comparative Example 4, it was found difficult to form Ba-rich secondary phases inside particle by the method of post-adding the BaCO₃ powder to the dielectric raw material (BaTiO₃ powder). As with Comparative Example 3, Comparative Example 4 could not satisfy the reference value of the bending amount f and had an insufficient mechanical strength of the dielectric layers.

In contrast to the results of Comparative Examples 1-4 mentioned above, Examples 1-3 obtained the dielectric raw material by high temperature—slow cooling firing in a state where Ba was excessive and were found to have Ba-rich secondary phases formed inside the dielectric particles. In Examples 1-3, the bending amount f was 7.0 mm or more, and the relative permittivity was improved as compared with Comparative Examples. From this result, it was confirmed that both of the mechanical strength of the dielectric layers and the relative permittivity can be improved at the same

TABLE 1

| | Dielectric Particles | | | | | | Evaluation Results | | |
|---|---|---|---|---|---|---|---|---|---|
| | | | Large Particles | | Small Particles | | Bending Strength Test | | High |
| Sample No. | Area Ratio of First Particles $A_F/A$ % | Average Particle Size of Secondary Phases nm | Area Ratio $A_L/A$ % | Area Ratio $A_{LE}/A_L$ % | Area Ratio $A_S/A$ % | Area Ratio $A_{SE}/A_S$ % | Maximum Bending Amount f nm | Relative Permittivity — | Temperature Load Life (MTTF) h |
| Comp. Ex. 1 | 0 | — | 100 | 0 | 0 | 0 | 3.69 | 2290 | 0.8 |
| Comp. Ex. 2 | 0 | — | 0 | 0 | 100 | 0 | 7.05 | 1188 | 96.1 |
| Comp. Ex. 3 | 0 | — | 50 | 0 | 50 | 0 | 3.17 | 2248 | 4.0 |
| Comp. Ex. 4 ※ | 0 | — | 55 | 0 | 45 | 0 | 3.44 | 2321 | 5.2 |
| Ex. 1 | 63 | 53 | 100 | 63 | 0 | 0 | 7.36 | 2812 | 8.1 |
| Ex. 2 | 36 | 35 | 53 | 67 | 47 | 0 | 7.27 | 2442 | 92.1 |
| Ex. 3 | 59 | 36 | 59 | 61 | 41 | 55 | 8.22 | 2508 | 78.2 |

Evaluation Results of Experiment 1

As shown in Table 1, in none of Comparative Examples 1-3, no Ba-rich secondary phases were formed inside the dielectric particles. In Comparative Example 1, the reference value of the bending amount f could not be satisfied, and the mechanical strength of the dielectric layers was insufficient. In Comparative Example 2 (the particle size of the dielectric particles was smaller than that in Comparative Example 1), the reference value of the bending amount f was satisfied, but the relative permittivity was significantly lower than that in Comparative Example 1, and the reference value of relative permittivity could not be satisfied. In Comparative Example 3 (large particles and small particles were mixed), the relative permittivity was 2000 or more, but the reference value of the bending amount f could not be satisfied, and the mechanical strength of the dielectric layers was insufficient. From the results of Comparative Examples 1-3, it was found difficult to improve both of the mechanical strength of the dielectric layers and the relative permittivity at the same time only by adjusting the particle size of the dielectric particles.

In Comparative Example 4, the BaCO₃ powder was added separately from the dielectric raw material (BaTiO₃ powtime by the Ba-rich secondary phases existing inside particle, not in grain boundaries.

Comparing the results of Examples 1-3, the MTTF was dramatically improved in Examples 2 and 3, which large particles and small particles were contained as dielectric particles. In particular, the MTTF of Example 2 was the most favorable result. From this result, it was found that the high temperature load life was further improved by the large particles and the small particles contained as the dielectric particles and the secondary phases existing inside the large particles. In Example 3, the average particle size of the secondary phases contained in the large particles was 42 nm, and the average particle size of the secondary phases contained in the small particles was 28 nm.

Experiment 2

Examples 11-18

In Experiment 2, multiple types of capacitor samples with different secondary-phase particle sizes and different amounts of particles containing secondary phases were prepared, and their performances were evaluated. In Examples 11 and 16, a dielectric raw material was prepared by changing a cooling rate during high temperature—slow cooling firing, and capacitor samples whose particle size of secondary phases and ratio of large particles containing secondary phases were different from those in Experiment 1 were manufactured. In Examples 17 and 18, a dielectric raw material was prepared by changing a blending ratio of a raw material powder for first particles and a raw material powder for second particles, and capacitor samples whose area ratio of large particles was different from that in Experiment 1 were obtained. In Examples 11-18 of Experiment 2, the same evaluation as in Experiment 1 was carried out under the same experimental conditions as in Example 2 of Experiment 1 other than the above-mentioned ones. The evaluation results are shown in Table 2.

permittivity tended to be low when the area ratio $A_L/A$ of large particles was low. On the contrary, the result of Example 18 shows that the relative permittivity tended to be high when the area ratio of large particles was high. The results of the examples shown in Table 2 show that, in order to obtain a higher relative permittivity while securing the mechanical strength, the area ratio $A_L/A$ of large particles was preferably 50% or more, more preferably 50-90%. In Example 18, which had a higher area ratio $A_L/A$ of large particles, a high relative permittivity was obtained, but the

TABLE 2

| | Dielectric Particles | | | | | | Evaluation Results | | |
|---|---|---|---|---|---|---|---|---|---|
| | Area Ratio of First Particles $A_F/A$ % | Average Particle Size of Secondary Phases nm | Large Particles | | Small Particles | | Bending Strength Test Maximum Bending Amount f nm | Relative Permittivity — | High Temperature Load Life (MTTF) h |
| Sample No. | | | Area Ratio $A_L/A$ % | Area Ratio $A_{LE}/A_L$ % | Area Ratio $A_S/A$ % | Area Ratio $A_{SE}/A_S$ % | | | |
| Ex. 11 | 31 | 46 | 58 | 54 | 42 | 0 | 7.67 | 2419 | 66.2 |
| Ex. 12 | 21 | 37 | 51 | 42 | 49 | 0 | 5.43 | 2184 | 55.3 |
| Ex. 13 | 42 | 92 | 59 | 71 | 41 | 0 | 7 58 | 2152 | 71.9 |
| Ex. 14 | 23 | 140 | 42 | 54 | 58 | 0 | 7.57 | 1729 | 86.5 |
| Ex. 15 | 34 | 14 | 59 | 58 | 41 | 0 | 7.67 | 2096 | 50.7 |
| Ex. 16 | 36 | 8 | 45 | 79 | 55 | 0 | 5 37 | 2050 | 8.2 |
| Ex. 17 | 6 | 44 | 12 | 52 | 88 | 0 | 7.81 | 1564 | 40.4 |
| Ex. 18 | 77 | 34 | 86 | 90 | 14 | 0 | 7.30 | 2838 | 13.4 |

Evaluation Results of Experiment 2

In Table 2, comparing the results of Examples 11-13, it was confirmed that the area ratio $A_{LE}/A_L$ was preferably 50% or more, more preferably 50-75%. In addition, comparing the results of Examples 13-16, it was confirmed that the bending strength tended to be low when the average particle size of the secondary phases was small, and it was confirmed that the relative permittivity tended to be low when the average particle size of the secondary phases was large. From the results of Examples 13-16, it was confirmed that when the average particle size of the secondary phases was 10-100 nm, the bending strength was higher, and the relative permittivity was also higher.

In Example 17, the area ratio $A_L/A$ of large particles in a cross section of the dielectric layers was lower than that of the other examples. On the other hand, in Example 18, the area ratio $A_L/A$ of large particles was higher than of the other examples. The result of Example 17 shows that the relative MTTF tended to be lower than that in the other examples. This result shows that the area ratio $A_L/A$ of large particles was preferably 50-80% in order to further improve the MTTF while securing the mechanical strength.

Experiment 3

Examples 21-23

In Experiment 3, a raw material powder for first particles was prepared by changing a molar ratio of $BaCO_3$ to $TiO_2$, and capacitor samples according to Examples 21-23 were obtained. In Experiment 3, a Ba/Ti ratio in secondary phases was measured by point analysis of EPMA. The results are shown in Table 3. In each of Examples 21-23 of Experiment 3, the experimental conditions other than the above-mentioned ones were the same as those in Example 3 of Experiment 1, and the same evaluation as in Experiment 1 was performed. The evaluation results are shown in Table 3.

TABLE 3

| | Dielectric Particles | | | | | | | Evaluation Results | | |
|---|---|---|---|---|---|---|---|---|---|---|
| | Area Ratio of First Particles $A_F/A$ % | Secondary Phases | | Large Particles | | Small Particles | | Bending Strength Test Maximum Bending Amount f nm | Relative Permittivity — | High Temperature Load Life (MTTF) h |
| Sample No. | | Average Particle Size nm | Ba/Ti Ratio | Area Ratio $A_L/A$ % | Area Ratio $A_{LE}/A_L$ % | Area Ratio $A_S/A$ % | Area Ratio $A_{SE}/A_S$ % | | | |
| Ex. 21 | 36 | 35 | 1.40 | 53 | 67 | 47 | 0 | 7.27 | 2442 | 92.1 |
| Ex. 22 | 39 | 44 | 1.22 | 59 | 66 | 41 | 0 | 7.44 | 2244 | 68.1 |
| Ex. 23 | 31 | 31 | 1.98 | 52 | 59 | 48 | 0 | 7.32 | 2382 | 77.2 |

Evaluation Results of Experiment 3

From the results shown in Table 3, it was confirmed that when the Ba/Ti ratio in the secondary phases was in the range of 1.2-2.0, the evaluation results of the bending strength, the relative permittivity, and the MTTF were particularly good.

DESCRIPTION OF THE REFERENCE NUMERICAL

1 . . . multilayer ceramic capacitor
    4 . . . external electrode
    10 . . . element body
        3 . . . internal electrode layer
        2 . . . dielectric layer
            20 . . . dielectric composition
                21 . . . dielectric particle
                21E . . . dielectric particle containing secondary phases
                21Ea . . . main phase
                21Eb . . . secondary phase
                21N . . . dielectric particle containing no secondary phases
                21L . . . large particle
                21S . . . small particle
            23 . . . grain boundary
            23a . . . grain-boundary segregation phase

What is claimed is:

1. A dielectric composition comprising dielectric particles, wherein at least one of the dielectric particles include:
   a main phase having a main component of barium titanate; and
   a secondary phase existing inside the main phase and having a higher barium content than the main phase, and
   a ratio (Ba/Ti) of a barium element content to a titanium element content in the secondary phase is 1.2-2.0.

2. The dielectric composition according to claim 1, wherein the secondary phase has a particle size of 10 nm or more and 100 nm or less.

3. The dielectric composition according to claim 1, wherein an area ratio occupied by the dielectric particles each including the secondary phase in a cross section of the dielectric composition is 30-80%.

4. A multilayer ceramic electronic component comprising the dielectric composition according to claim 1.

5. The dielectric composition according to claim 1, wherein the dielectric particles include large particles having a circle equivalent diameter of 0.5 μm or more and small particles having a circle equivalent diameter of less than 0.5 μm, and
   the secondary phase is included in at least a portion of the large particles.

6. The dielectric composition according to claim 5, wherein a ratio of an area occupied by the large particles each including the secondary phase to an area occupied by the large particles in a cross section of the dielectric composition is 50% or more.

7. The dielectric composition according to claim 6, wherein a ratio of the area occupied by the large particles in the cross section of the dielectric composition is 50-90%.

8. The dielectric composition according to claim 5, wherein a ratio of an area occupied by the large particles in a cross section of the dielectric composition is 50-90%.

9. A dielectric composition comprising dielectric particles, wherein at least one of the dielectric particles include:
   a main phase having a main component of barium titanate; and
   a secondary phase existing inside the main phase and having a higher barium content than the main phase,
   the dielectric particles include large particles having a circle equivalent diameter of 0.5 μm or more and small particles having a circle equivalent diameter of less than 0.5 μm, and
   the secondary phase is included in at least a portion of the large particles.

10. The dielectric composition according to claim 9, wherein a ratio of an area occupied by the large particles each including the secondary phase to an area occupied by the large particles in a cross section of the dielectric composition is 50% or more.

11. The dielectric composition according to claim 10, wherein a ratio of the area occupied by the large particles in the cross section of the dielectric composition is 50-90%.

12. The dielectric composition according to claim 9, wherein a ratio of an area occupied by the large particles in a cross section of the dielectric composition is 50-90%.

13. The dielectric composition according to claim 9, wherein the secondary phase has a particle size of 10 nm or more and 100 nm or less.

14. The dielectric composition according to claim 9, wherein an area ratio occupied by the dielectric particles each including the secondary phase in a cross section of the dielectric composition is 30-80%.

15. A multilayer ceramic electronic component comprising the dielectric composition according to claim 9.

* * * * *